United States Patent
Sasaki

(10) Patent No.: US 10,795,623 B2
(45) Date of Patent: Oct. 6, 2020

(54) IMAGE FORMING APPARATUS AND CONTROL METHOD FOR THE IMAGE FORMING APPARATUS FOR READING OUT DATA AND PERFORMING INITIALIZATION PROCESSING USING THE DATA

(71) Applicant: CANON KABUSHIKI KAISHA, Tokyo (JP)

(72) Inventor: Hidemi Sasaki, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/845,693

(22) Filed: Dec. 18, 2017

(65) Prior Publication Data

US 2018/0173565 A1 Jun. 21, 2018

(30) Foreign Application Priority Data

Dec. 21, 2016 (JP) .................. 2016-248233

(51) Int. Cl.
*G06F 3/12* (2006.01)

(52) U.S. Cl.
CPC .......... *G06F 3/1248* (2013.01); *G06F 3/1212* (2013.01); *G06F 3/1213* (2013.01); *G06F 3/1229* (2013.01); *G06F 3/1259* (2013.01); *G06F 3/1279* (2013.01)

(58) Field of Classification Search
CPC .... G06F 3/1244; G06F 3/1245; G06F 3/1246; G06F 3/1247; G06F 3/1248
See application file for complete search history.

(56) References Cited

U.S. PATENT DOCUMENTS

| | | | |
|---|---|---|---|
| 6,295,134 B1 * | 9/2001 | Hughes | G06K 15/00 358/1.13 |
| 2004/0165213 A1 * | 8/2004 | Han | G06F 3/1205 358/1.15 |
| 2006/0250649 A1 * | 11/2006 | Housel | G06F 3/122 358/1.16 |

(Continued)

FOREIGN PATENT DOCUMENTS

| | | |
|---|---|---|
| CN | 104427178 A | 3/2015 |
| CN | 105320497 A | 2/2016 |
| JP | 2012-40833 A | 3/2012 |

*Primary Examiner* — Nicholas Pachol
(74) *Attorney, Agent, or Firm* — Canon U.S.A., Inc. IP Division

(57) ABSTRACT

An apparatus having first and second functions includes a first storage unit that stores data used in first initialization processing of the first function and second initialization processing of the second function, a second storage unit having a data reading speed higher than that of the first storage unit, an execution unit that executes the first initialization processing and the second initialization processing after the first initialization processing, and an acceptance unit that accepts a job of the first function after the first initialization processing, in which the execution unit executes cache processing for caching the data used in the second initialization processing from the first storage unit into the second storage unit during a predetermined period after the first initialization processing is performed and before the job of the first function is accepted and further executes the second initialization processing by using the cached data.

6 Claims, 8 Drawing Sheets

(56) References Cited

U.S. PATENT DOCUMENTS

| | | | |
|---|---|---|---|
| 2007/0223027 A1* | 9/2007 | Shindo | G06F 3/1208 358/1.13 |
| 2007/0253024 A1* | 11/2007 | Chatcavage | G06F 3/1219 358/1.16 |
| 2008/0209419 A1* | 8/2008 | Maeda | G06F 3/1204 718/100 |
| 2008/0246994 A1* | 10/2008 | Matsumoto | G06F 3/1208 358/1.15 |
| 2009/0080025 A1* | 3/2009 | Aronshtam | G06F 3/1214 358/1.17 |
| 2009/0190156 A1* | 7/2009 | Iwadate | G06F 3/1214 358/1.14 |
| 2010/0085590 A1* | 4/2010 | Williams | G06K 15/02 358/1.13 |
| 2010/0202008 A1* | 8/2010 | Aronshtam | G06K 15/02 358/1.15 |
| 2012/0243033 A1* | 9/2012 | Hayakawa | G06K 15/1822 358/1.15 |
| 2012/0293832 A1* | 11/2012 | Fujita | G06F 3/1244 358/1.15 |
| 2013/0010316 A1 | 1/2013 | Tokuda | |
| 2013/0104142 A1 | 4/2013 | Utsumi | |
| 2014/0126008 A1* | 5/2014 | Hayakawa | G06F 3/1245 358/1.13 |
| 2014/0316761 A1* | 10/2014 | Thach | G06F 9/455 703/22 |
| 2014/0365735 A1* | 12/2014 | Kuwamura | G06F 8/4442 711/144 |
| 2016/0034402 A1* | 2/2016 | Goshima | G06F 12/0875 711/125 |
| 2017/0180582 A1* | 6/2017 | Kodama | H04N 1/00891 |
| 2017/0243089 A1* | 8/2017 | Takenaka | G06K 15/1805 |

\* cited by examiner

FIG. 3

|  | FIRST TASK INITIALIZATION PROCESSING | SECOND TASK INITIALIZATION PROCESSING |
|---|---|---|
| 1 | HARDWARE RESOURCE CONTROL UNIT INITIALIZATION | |
| 2 | FILE SYSTEM CONTROL UNIT INITIALIZATION | |
| 3 | SCREEN CONTROL UNIT INITIALIZATION | |
| 4 | COMMUNICATION CONTROL UNIT INITIALIZATION | |
| 5 | PDL CONTROL UNIT INITIALIZATION (FIRST PDL) | |
| 6 | RIP CONTROL UNIT INITIALIZATION | |
| 7 | JOB CONTROL UNIT INITIALIZATION | |
| 8 | | PDL CONTROL UNIT INITIALIZATION (SECOND PDL) |
| 9 | | EXTENDED FUNCTION CONTROL UNIT INITIALIZATION |
| 10 | | EXTENDED FUNCTION MODULE INITIALIZATION |

FIG. 5

| No. | PREFETCHING FILE LIST |
|---|---|
| 501 | /var/rom/app/core.app |
| 502 | /var/rom/app/uiManager.app |
| 503 | /var/rom/app/statusManager.app |
| 504 | /var/rom/app/authManager.app |
| 505 | /var/rom/pdl/StandardFont.dat |
| 506 | /var/rom/pdl/KanjiFont.dat |
| 507 | /var/rom/pdl/CMYKProfile.dat |
| 508 | /var/storage/app/ICCardReader.app |

IMAGE FORMING APPARATUS AND CONTROL METHOD FOR THE IMAGE FORMING APPARATUS FOR READING OUT DATA AND PERFORMING INITIALIZATION PROCESSING USING THE DATA

BACKGROUND OF THE INVENTION

Field of the Invention

The aspect of the embodiments relates to an image forming apparatus and a control method for the image forming apparatus.

Description of the Related Art

An image forming apparatus reads out data used in initialization processing after a power source is turned on and performs the initialization processing by using the data. The image forming apparatus that performs this initialization processing in a phased manner has been proposed. The image forming apparatus performs the initialization processing such that functions including a printing function of PDL data of a first type can be executed after the power source is turned on. This is also referred to as activation of a first task. A PDL interpreter or the like configured to interpret the PDL data of the first type is activated by the activation of the first task, and a printing job of the PDL data of the first type can be processed. Subsequently, after completion of the activation of the first task, the image forming apparatus performs the initialization processing such that a printing function of PDL data of a second type and other functions having relatively low use frequencies as compared with the printing function of the PDL data of the first type can be executed. This initialization processing includes, for example, activation of the PDL interpreter configured to interpret the PDL data of the second type and the like. This is referred to as activation of a second task. When a printing job that can be processed after the completion of the activation of the first task is activated during the activation of the second task in the above-described phased initialization processing, a conflict between the processing of the printing job and the activation of the second task may occur in some cases.

In view of the above, during a predetermined period after the activation of the first task, the printing job of the PDL data of the first type can be accepted, and also the activation of the second task is not performed in an image forming apparatus described in Japanese Patent Laid-Open No. 2012-40833. As a result, it is possible to process the PDL data printing job that can be processed by the activation of the first task without the conflict with the activation of the second task during the predetermined period after the activation of the first task.

However, according to Japanese Patent Laid-Open No. 2012-40833, since preparation for the activation of the second task is not started during the above-described predetermined period in which the processing of the printing job is prioritized, the completion of the activation of the second task is delayed.

SUMMARY OF THE INVENTION

According to an aspect of the embodiments, there is provided an image forming apparatus having a first function and a second function, the apparatus including a first storage unit configured to store data used in first initialization processing of the first function and data used in second initialization processing of the second function, a second storage unit having a data reading speed higher than that of the first storage unit, an execution unit configured to execute the first initialization processing and execute the second initialization processing after the first initialization processing, and an acceptance unit configured to accept a job of the first function after the first initialization processing, in which the execution unit further executes cache processing for caching the data used in the second initialization processing from the first storage unit into the second storage unit during a predetermined period after the first initialization processing is performed and before the job of the first function is accepted, and the execution unit further executes the second initialization processing by using the data cached in the second storage unit.

Further features of the disclosure will become apparent from the following description of exemplary embodiments with reference to the attached drawings.

BRIEF DESCRIPTION OF THE DRAWINGS

FIG. 3 is a table illustrating initialization processing contents of a first task and a second task.

FIG. 5 illustrates an example of a prefetching file list according to the first exemplary embodiment.

DESCRIPTION OF THE EMBODIMENTS

Figure 1:
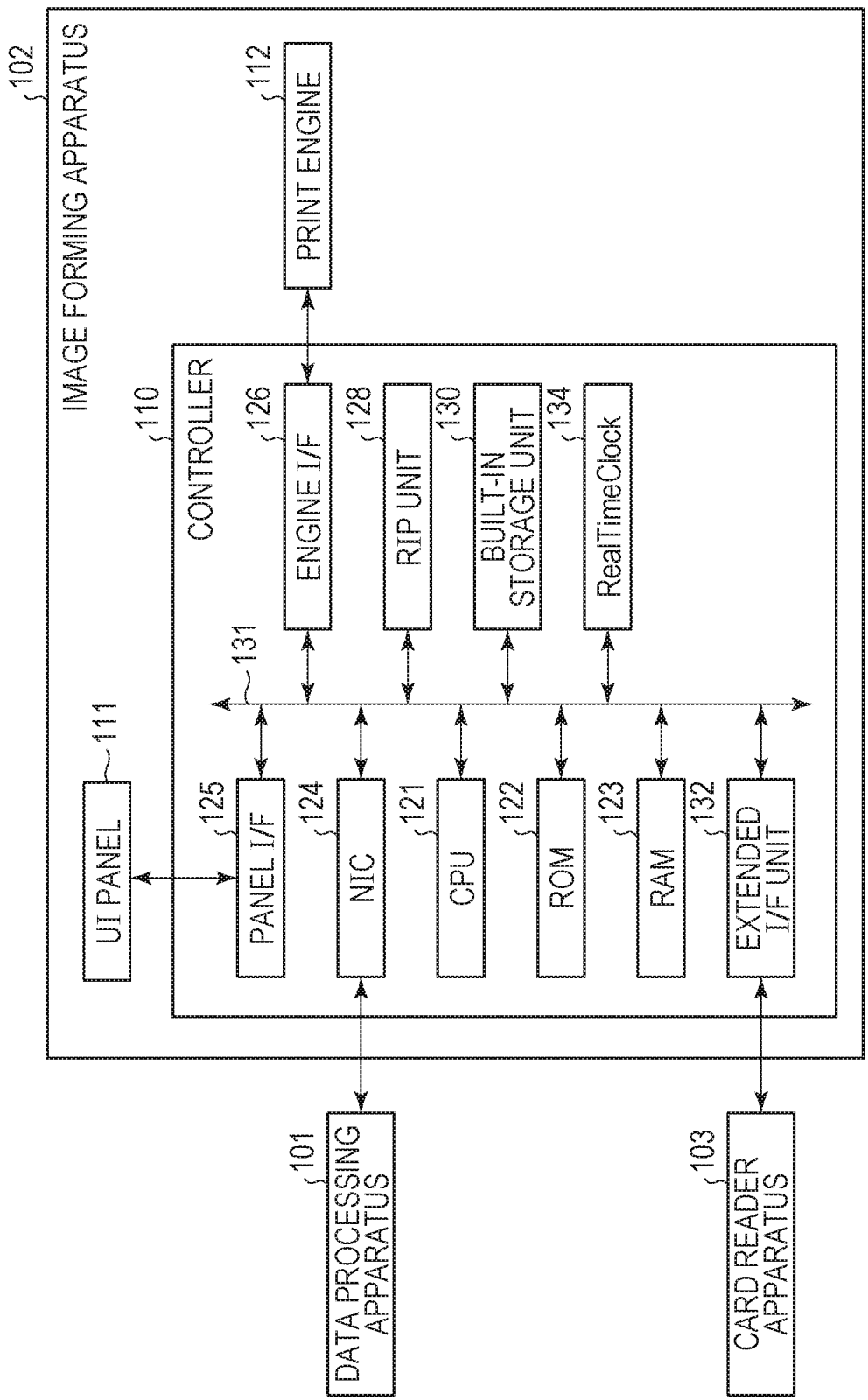
FIG. 1 is a block diagram illustrating a configuration of an image forming apparatus.

Hereinafter, exemplary embodiments of the disclosure will be described with reference to the drawings.

First Exemplary Embodiment

An image forming apparatus according to the present exemplary embodiment performs first task initialization processing and second task initialization processing illustrated in FIG. 3. The task initialization processings which are classified into these two types are performed as follows. First, the image forming apparatus executes and completes the first task initialization processing. Next, the image forming apparatus starts reading of data of a data file used for executing the second task initialization processing (predetermined processing) (see FIG. 5) from a first storage unit (for example, a read only memory (ROM)) to a second storage unit (for example, a random access memory (RAM)). That is, the image forming apparatus caches the data read out from the first storage unit into the second storage unit so that the data is used for the second task initialization processing which will be performed in a later stage. The image forming apparatus attempts to execute this reading (prefetching operation) for only a predetermined period, and the image forming apparatus does not execute the second task initialization processing at least while the prefetching operation is performed. That is, the data prefetching is performed, but the initialization processing using the data is not performed. Herein, in a case where the image forming apparatus accepts a job related to the first task (or an execution instruction of the job) during the predetermined period, the image forming apparatus stops the prefetching operation and starts execution of the job.

In this manner, since the image forming apparatus according to the present exemplary embodiment completes the first task initialization processing before the second task initialization processing is executed, it is possible to expedite the start of the execution of the job related to the first task. Subsequently, after the completion of the first task initialization processing, when the job related to the first task is accepted during the prefetching operation of the data file used for the second task initialization processing, the prefetching operation is stopped, and the conflict between the prefetching operation and the job execution can be avoided. It should be noted that, since the second task initialization processing can be performed by using the prefetched and cached data file even in a case where the job is accepted, it is possible to expedite the completion of the second task initialization processing as compared with a related-art technology. On the other hand, in a case where the job is not accepted, the second task initialization processing is executed by using the cached data file. As a result, it is possible to expedite the completion of the second task initialization processing as compared with a case where the second task initialization processing is executed after the reading of the data file from the first storage unit is started after the elapse of the above-described predetermined period.

FIG. 1 is a block diagram illustrating a configuration of the image forming apparatus.

A data processing apparatus 101 (for example, a personal computer (PC)) generates PDL data and transmits the PDL data to an image forming apparatus 102 via a LAN.

The image forming apparatus 102 (for example, a laser printer) receives the PDL data from the data processing apparatus 101 and performs image formation on a sheet on the basis of the PDL data. It should be noted that the image forming apparatus 102 may be a multi function peripheral including a scanner function, a facsimile function, and the like.

A card reader apparatus 103 is an apparatus connected to the image forming apparatus 102 via a cable such as USB and configured to read authentication information of a user who desires to operate the image forming apparatus 102 from an IC card. The IC card includes a unique ID for identifying an individual as the authentication information. The card reader apparatus 103 wirelessly reads the authentication information from the IC card.

The image forming apparatus 102 is roughly divided into a controller 110, a UI panel 111, and a print engine 112.

The UI panel 111 is a user interface and includes a display unit configured to transmit various information to the user and an operation unit configured to accept various operations from the user. For example, the UI panel 111 may be provided with a touch panel and the like in addition to a physical button. The UI panel 111 may also be provided with a function for notifying the user of an error or a warning occurring in the image forming apparatus 102 by way of light illumination or flushing using a light-emitting diode. Alternatively, the UI panel 111 may also be provided with a function for notifying the user of an error or a warning occurring in the image forming apparatus 102 by way of sound using a buzzer or the like.

The controller 110 generates bitmap data for printing on the basis of the PDL data transmitted from the data processing apparatus 101 and transmit the bitmap data to the print engine 112. It should be noted that the controller 110 itself can also generate the PDL data and instruct the printing to print a setting or a state related to the image forming apparatus 102 as a report.

The print engine 112 performs image formation according to an electrophotographic method on the basis of the bitmap data received from the controller 110. It should be noted that the method for the image formation may be, for example, an inkjet method and a thermosensitive method in addition to the electrophotographic method. In addition, the print engine 112 may be provided with recording materials of a plurality of colors and can perform color printing of the PDL data. Alternatively, the print engine 112 may be provided with a plurality of sheet feeding decks, and a sheet can be fed from a sheet feeding deck specified by the PDL data.

The controller 110 includes a central processing unit (CPU) 121 (equivalent to an execution unit), a ROM 122 (equivalent to a first storage unit), a RAM 123 (equivalent to a second storage unit), a network interface controller (NIC) 124, and a panel I/F 125. The controller 110 further includes an engine I/F 126, a RIP unit 128, a built-in storage unit 130, and an extended I/F unit 132. The controller 110 further includes a bus 131 that connects these components to one another.

The CPU 121 develops a program of a controller firmware 200 stored in the ROM 122 on the RAM 123 and executes the program to perform control on the image forming apparatus 102. For example, the CPU 121 interprets the received PDL data in accordance with the program and generates intermediate data.

The ROM 122 is a non-volatile memory that stores the program of the controller firmware 200 executed by the CPU 121, a prefetching file list illustrated in FIG. 5, and the like. It should be noted that, for example, an initial program including only basic functions such as a minimum file system access function is activated, and the initial program executes the controller firmware 200 on the file system, so that it is also possible to execute the program of the image forming apparatus.

The RAM 123 stores the program of the controller firmware 200 developed by the ROM 122 and the like. The RAM 123 also stores the PDL data, the intermediate data generated by interpreting the PDL data, the bitmap data generated by performing rendering of the intermediate data, various temporary processing statuses and log information used for other processings, and the like. In addition, the prefetching file list which will be described below is read out on the RAM 123 to be held.

The NIC 124 is a network interface controller that connects the data processing apparatus 101 and the controller 110 to each other and relays bidirectional data communications, that is, transmission and reception of data. The PDL data generated by the external data processing apparatus 101 can be received by the NIC 124. It should be noted that a mode for establishing a wireless connection may be adopted in addition to a mode for establishing a wired connection as a connection mode. In a case where a priority connection is established, the NIC 124 and the data processing apparatus 101 are connected to each other by Ethernet (registered trademark) or the like.

The panel I/F 125 connects the UI panel 111 and the controller 110 to each other and relays the bidirectional data communications, that is, the transmission and the reception of the data.

The engine I/F 126 connects the print engine 112 and the controller 110 to each other and relays the bidirectional data communications, that is, the transmission and the reception of the data.

The RIP unit 128 converts the intermediate data into the bitmap data to be developed on the RAM 123. It should be noted that descriptions will be provided of a mode in which the RIP unit 128 uses a dedicated-use chip independent from the CPU 121 according to an exemplary embodiment of the disclosure. As another mode, a method may be used in which the CPU 121 performs processings up to the conversion processing into the bitmap data without the provision of the RIP unit 128.

The built-in storage unit 130 is a non-volatile storage area for holding an extended program used by the controller 110 and the like. For example, the built-in storage unit 130 can be realized by a flash ROM. Alternatively, the built-in storage unit 130 can also be realized by a hard disc, a solid-state drive, or the like.

A real time clock (RTC) 134 is a hard chip configured to manage time information in the image forming apparatus 102 in a non-volatile manner. The RTC 134 has a function of regularly updating the time information or the like even after the power source of the image forming apparatus 102 is turned off since the RTC 134 is driven by a battery.

The bus 131 connects the respective components included in the controller 110 to one another.

Figure 2:
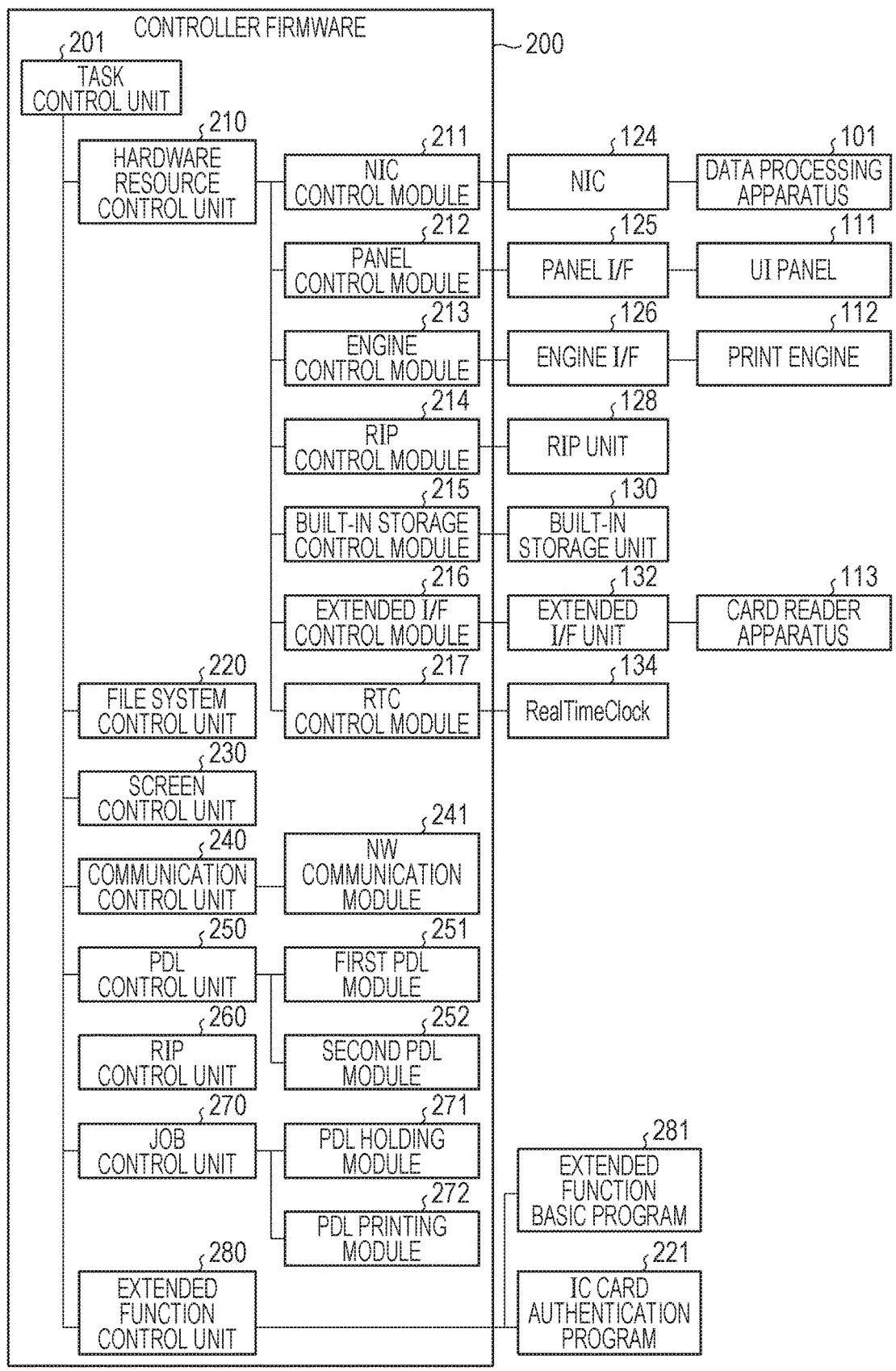
FIG. 2 is a block diagram illustrating a configuration of controller firmware.

FIG. 2 is a block diagram illustrating a configuration of the controller firmware.

The program of the controller firmware 200 is stored in the ROM 122. The CPU 121 develops the program on the RAM 123 to be executed. The controller firmware 200 includes a predetermined number of control units and modules that control the image forming apparatus 102.

The controller firmware 200 includes a task control unit 201. The task control unit 201 activates tasks for activating respective control units which will be described below. When the tasks corresponding to the respective control units are activated, the corresponding control unit is activated, and the initialization processing is executed. As a result of the initialization processing of this control unit, respective modules under control of the control unit are activated. Herein, the initialization of the control unit includes a setting of a memory environment where the control unit and the respective modules corresponding to the control unit can be operated. For example, the initialization includes processing for securing a work memory area corresponding to the control unit and the respective modules in the RAM 123 and processing for writing data in the secured work memory area as appropriate.

The controller firmware 200 includes a hardware resource control unit 210. The hardware resource control unit 210 includes an NIC control module 211, a panel control module 212, and an engine control module 213. The hardware resource control unit 210 also includes an RIP control module 214, a built-in storage control module 215, an extended I/F control module 216, and an RTC control module 217.

The NIC control module 211 is a control module configured to communicate with the data processing apparatus 101 that is connected to the outside via the NIC 124. The panel control module 212 is a control module configured to communicate with UI panel 111 that is connected to the outside via the panel I/F 125. As a result, the controller firmware 200 can perform the notification of the image data desired to be displayed on the LCD included in the UI panel 111. In addition, the controller firmware 200 can receive an event in a case where a button of the event provided on the UI panel 111 is pressed.

The engine control module 213 is a control module configured to communicate with the print engine 112. The RIP control module 214 is a control module configured to control the RIP unit 128. The controller firmware 200 can notify the RIP unit 128 of the intermediate data stored on the RAM 123, an address of the bitmap data developed on the RAM 123 and the like via the RIP control module 214.

The built-in storage control module 215 is a control module configured to control the built-in storage unit 130. The extended I/F control module 216 is a control module configured to communicate with a card reader apparatus 113 that is connected to the outside via the extended I/F unit 132. The RTC control module 217 controls the RTC 134 and obtains a current time when the power source is turned on, for example, to update the time information of the entire system.

The controller firmware 200 includes a file system control unit 220. The file system control unit 220 provides functions for the respective control modules and the respective control units to access the data, the program, and the like. The file system control unit 220 also includes a disc cache function. In a case where the files on the ROM 122 or the built-in storage unit 130 are read, part or all of the files are stored on the RAM 123 as a disc cache. With this configuration, in a case where the read request is issued again, notification of the contents on the disc cache can be performed as the read result without accessing the ROM 122 or the built-in storage unit 130. Incidentally, a case occurs where the data reading from the ROM 122 is particularly slow. In the above-described case, the data is compressed by using various compression algorithms to be stored on the ROM 122. Subsequently, when the read request is accepted, the compressed data is developed on the RAM 123, and notification of the developed data can be performed as the read result according to the disc cache function. With regard to the already developed data at this time, in a case where the read request is accepted next time, notification of the developed data is performed as the read result. For example, when the original data is compressed to 50% in size to be stored, the data amount to be read from the ROM 122 can also be halved. However, the processing amount to be performed by the CPU 121 is increased.

The controller firmware 200 also includes a screen control unit 230. The screen control unit 230 is a module configured to form an image to be displayed on the LCD on the UI panel 111 for performing notification in accordance with a state or situation of the image forming apparatus 102. For example, a state of the job where printing is performed is displayed, or a warning is displayed in a case where sheet jam occurs.

The controller firmware 200 also includes a communication control unit 240. The communication control unit 240 includes an NW communication module 241. The NW communication module 241 is a control unit configured to perform control such that a communication is performed with the external data processing apparatus 101 via the NIC control module 211. For example, transmission and reception of a command corresponding to a protocol for performing a network communication are performed. The communication control unit 240 may support a wireless communication unit although the descriptions are omitted to simplify the explanation herein. Alternatively, the communication control unit 240 may support a wired communication unit other than the NIC.

The controller firmware 200 also includes a PDL control unit 250. The PDL control unit 250 includes a first PDL module 251 and a second PDL module 252. The first PDL module 251 includes one or more PDL interpreters that interpret the PDL used by the user. The second PDL module 252 includes the PDL interpreter that interprets the PDL having a low use frequency and the single PDL interpreter that particularly takes time for the activation. The respective PDL interpreters interpret the PDL data which is notified of from the PDL printing module 272 described below to generate the intermediate data. When the first PDL module 251 is activated by the activation of the first task as described below in the initialization of the PDL control unit 250, the PDL data of the first type can be processed. After the activation of the first PDL module 251, the second PDL module 252 is activated by the activation of the second task. Since the first PDL module 251 is activated in first, the image forming apparatus can be promptly shifted to a state in which the printing job of the PDL data of the first type can be processed. A work memory area allocated on the RAM 123 is used in the interpretation processing by the PDL module.

The controller firmware 200 also includes a RIP control unit 260. The RIP control unit 260 controls the RIP unit 128 via the RIP control module 214 to develop the intermediate data generated by the PDL module into the bitmap data. It should be noted that the CPU 121 can also adopt the mode of dealing with the development processing of the bitmap data instead of the RIP unit 128 as described above.

The controller firmware 200 also includes a job control unit 270. The job control unit 270 includes a PDL holding module 271 and a PDL printing module 272. The job control unit 270 is a control unit configured to interpret a header the PDL data transmitted from the data processing apparatus 101 or part of the data to activate an appropriate PDL interpreter with respect to the PDL data, or the like.

The PDL holding module 271 is a module configured to store the PDL data on the built-in storage unit 130 in a case where notification of the PDL data where a holding instruction is issued from the data processing apparatus 101 is performed. The PDL holding module 271 is also a module configured to issue a printing instruction of the PDL data stored on the built-in storage unit 130 to the PDL printing module in a case where a printing instruction is issued from the UI panel 111 or an IC card authentication program 221 which will be described below. A job in which the above-described PDL data is stored and the PDL data is printed in accordance with the printing instruction from the user after the storage is referred to as a holding printing job, and the PDL data is received from the data processing apparatus 101 along with an instruction of the holding printing job.

The PDL printing module 272 is a module configured to execute the printing processing. In a case where the PDL data is received from the data processing apparatus 101, the PDL printing module 272 notifies the first PDL module 251 or the second PDL module 252 of the PDL data.

An extended function control unit 280 is a control unit configured to control an external program for realizing an extended function that is not included in the controller firmware 200. The extended function control unit 280 controls an extended function basic program 281 and the IC card authentication program 221. The extended function basic program 281 is an external program that provides a basic platform function for controlling the external program previously incorporated as a system. The IC card authentication program 221 is a function arbitrarily installed by the user. The IC card authentication program 221 performs printing instruction of the holding job with respect to the PDL holding module 271 on the basis of user information such as an ID read from the card reader apparatus 113. The image forming apparatus 102 may also include other external programs. It should be noted that the external program is included in the ROM 122 or the built-in storage unit 130.

FIG. 3 is a table illustrating contents of initialization processings of the controller which are performed upon activation of the controller firmware (activations of a first task and a second task).

The initialization processing is realized when the task control unit 201 calls initialization execution commands with respect to the respective control units. The initialization processings performed when the task control unit 201 activates the first task and the second task are referred to as first task initialization processing (first initialization) and second task initialization processing (second initialization). The first task initialization processing includes hardware resource control unit initialization, file system control unit initialization, screen control unit initialization, communication control unit initialization, PDL control unit initialization (first PDL), RIP control unit initialization, and job control unit initialization. That is, the hardware resource control unit 210, the file system control unit 220, the screen control unit 230, the communication control unit 240, the PDL control unit 250, the RIP control unit 260, and the job control unit are activated by the first task initialization processing. It should be noted however that the first PDL module 251 of the PDL control unit 250 is activated in the first task initialization processing, but the second PDL module 252 is not activated. In addition, both the extended function control unit 280 and the extended I/F control module 216 are not activated. The second PDL module 252, the extended function control unit 280, and the extended I/F control module 216 are activated in the second task initialization processing. That is, the second task initialization processing includes PDL control unit initialization (second PDL), extended function control unit initialization, and extended function module initialization. According to the present exemplary embodiment, the initialization processing of the IC card authentication program 221 is performed in the extended function module initialization.

For example, the PDL printing module 272 is activated by this first task initialization processing, and the interpretation processing the PDL data that can be interpreted by the first PDL module 251 can be performed. That is, the printing job of the PDL data of the first type can be processed. In addition, the PDL holding module 271 is activated, and the PDL data that can be interpreted by the first PDL module 251 and the PDL data that can be interpreted by the second PDL module 252 can be held in the built-in storage unit 130.

For example, the second PDL module 252 is activated by the second task initialization processing, and the interpretation processing of the PDL data that can be interpreted by the second PDL module 252 can be performed. That is, a printing job of the PDL data of the second type can be processed. In addition, when the extended function module, that is, the IC card authentication program 221 is activated, it is also possible to perform the printing processing of the job held in the built-in storage unit 130 while IC card authentication processing is used as a trigger.

Figure 4:
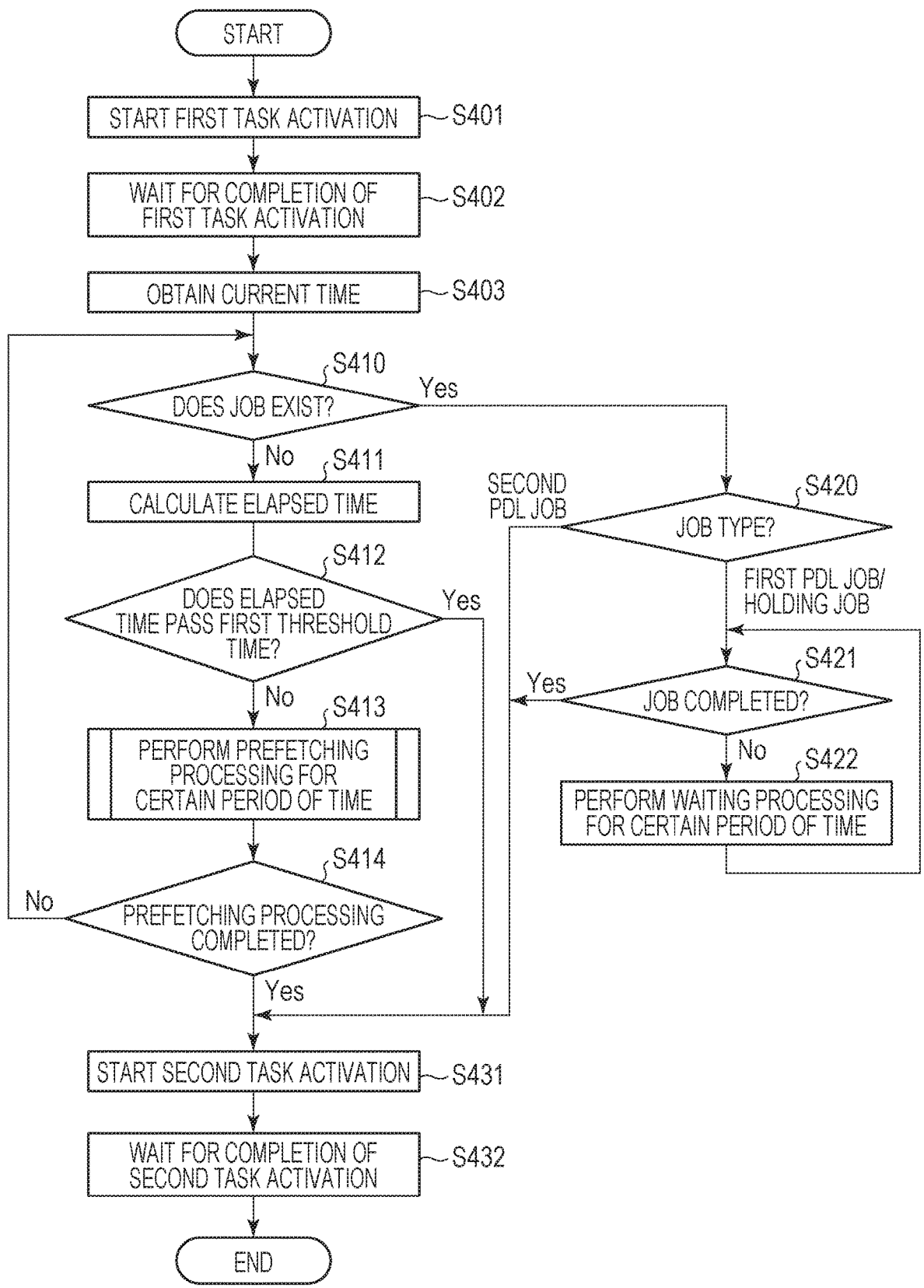
FIG. 4 is a flow chart illustrating a procedure of task activation control according to a first exemplary embodiment.

FIG. 4 is a flow chart illustrating a procedure of task activation control according to the present exemplary embodiment. According to this flow, when first initialization (activation of the PDL module or the like) is completed, a particular job (printing job of the PDL data of the first type) can be processed even before second initialization (activation of the second PDL module or the like) is completed. After the completion of the first initialization, processing related to the second initialization (prefetching processing which will be described below) is started. Subsequently, when execution of the particular job is instructed during a predetermined period after the completion of the first initialization (period until a first threshold time elapses from a start time which will be described below), the processing related to the second initialization performed thus far is stopped (or interrupted). As a result, it is possible to execute the particular job without conflicting with the processing related to the second initialization and also promptly start the processing related to the second initialization after the completion of the first initialization. Thus, the completion of the second initialization can be expedited as compared with a related-art technology.

It should be noted that this flow chart is implemented when the CPU 121 executes the program of the controller firmware 200 after the power source of the image forming apparatus is turned on. According to this flow, the task control unit 201 performs the processings in the respective steps.

The task control unit 201 starts the activation of the first task (S401). As a result, the initialization processings of the respective control units included in the first task initialization processing are started. That is, when the task control unit 201 starts the activation of the first task, the corresponding control units are activated, and those control units start the first initialization. The respective control units respectively perform operations on a thread or a process.

The task control unit 201 waits for the completion of the activation of the first task (S402). The respective control units that start the initialization processings in the first task initialization processing notify the task control unit 201 that the initialization is completed by a message communication function or the like at a timing when the initialization is completed. When the initialization of the control unit is completed, the function of the control unit where the initialization is completed can be executed even before the completion of the second task initialization processing. For example, it is possible to perform interpretation of the PDL data of the first type by the first PDL module 251. When all the initialization processings of the respective control units included in the first task initialization processing are completed, the task control unit 201 executes the next processing.

The task control unit 201 obtains the current time as a start time of job acceptance/data prefetching parallel processing via the RTC control module 217 (S403).

The task control unit 201 inquires the job control unit 270 whether or not the job is accepted (job execution is instructed). The job control unit 270 determines whether or not the job accepted at this moment exists and replies to the task control unit 201. The task control unit 201 branches the processing on the basis of the reply (S410).

In a case where the job is not accepted (S410: No), the task control unit 201 calculates a time spent for the job acceptance/data prefetching parallel processing (S411). Herein, a time elapsing from the current time obtained in S403, that is, an elapsed time is calculated. Specifically, the task control unit 201 obtains the current time via the RTC control module 217 and calculates the elapsed time by using a difference from the start time obtained in S403.

The task control unit 201 branches the processing depending on whether the elapsed time passes a first threshold time (S412). This threshold time is a predetermined time set for processing of the PDL data of the first type over the activation of the second task. According to the present exemplary embodiment, in a case where the PDL data of the first type is received before the elapsed time passes the threshold time, the prefetching processing which will be described below is stopped, and the processing of the received PDL data is performed. That is, it may be mentioned that this threshold time is a time when the processing of the PDL data of the first type can be interrupted in the prefetching processing. According to the present exemplary embodiment, a previously set time such as, for example, 5 seconds is set as the first threshold time.

In a case where the elapsed time does not pass the first threshold time (S412: No), the task control unit 201 performs the prefetching processing which will be described below for a certain time (S413). Herein, the certain time is shorter than the first threshold time and is, for example, 200 milliseconds. A method of determining this certain time will be described below with reference to FIG. 7.

The task control unit 201 branches the processing depending on whether or not the prefetching processing is completed (S414). Herein, a state in which the prefetching processing is completed refers to a state in which contents of all the files (all data used by the second task initialization processing) on the prefetching file list which will be described below can be developed into the disc cache on the RAM 123. Herein, the development into the disc cache of the file (data) is equivalent to storage of the file into the disc cache. The file in a compressed state also includes being stored into the disc cache in a decompressed state.

In a case where the prefetching processing is not completed, the task control unit 201 returns to S410. When the flow of the series is repeatedly performed for the threshold time, the data prefetching processing can also be performed in parallel while the job that can be processed by the first task initialization processing (first initialization) is accepted.

In a case where the elapsed time passes the first threshold time, the task control unit 201 starts the activation of the second task (S431). The second task initialization processing of the corresponding control unit (second initialization) is started by this activation of the second task.

The files (data) described on the prefetching file list which will be described below are used in this second task initialization processing. These files are stored in the ROM 122 or the built-in storage unit 130. When the files are already developed into the disc cache by the prefetching processing, the files developed into the disc cache are used the second task initialization processing. Specifically, the files (or part of the files) read out from the disc cache on the RAM 123 are developed into the work memory area of the RAM 123 to be used in the second task initialization processing. The reading of the files stored in the disc cache onto the work memory area is faster than the reading of the files stored in the ROM 122 or the built-in storage unit 130 onto the work memory area. For this reason, when the files are developed into the disc cache by the prefetching processing, it is possible to expedite the completion of the second task initialization processing. On the other hand, the files that are not developed into the disc cache are read out from the ROM 122 or the built-in storage unit 130 to the work memory area. That is, the second task initialization processing may be performed by using the files stored in the disc cache and the files stored in the ROM 122 or the built-in storage unit 130 in some cases.

The task control unit 201 waits for the completion of the activation of the second task (that is, the completion of the second task initialization processing of the corresponding control units) (S432). Then, the activation processing is completed.

In a case where the job is accepted, the task control unit 201 inquires the job control unit 270 on a type of the accepted job. The job control unit 270 notifies the task control unit 201 of the job type. The task control unit 201 branches the processing in accordance with the job type (S420).

When the job is a second PDL job (second PDL data printing job), the task control unit 201 immediately performs the activation processing of the second task and the activation completion waiting (S431, S432). After the completion of the activation processing, the task control unit 201 controls the respective control units so as to process this second PDL job.

When the job is a first PDL job (first PDL data printing job) or a holding job (holding printing job), the task control unit 201 controls the respective related control units so as to process the first PDL job. In addition, the task control unit 201 appropriately inquires the job control unit 270 whether or not the processing of the job is completed. The job control unit 270 notifies the task control unit 201 on whether or not the processing of the job is completed. The completion of the processing refers to any one of interpretation of the PDL data, generation of the bitmap, and discharge of the sheet on which the image is printed. According to the present exemplary embodiment, the completion the interpretation of the PDL data is regarded as the completion of the job processing. The task control unit 201 branches the processing in accordance with the completion result of the job processing which has been notified of (S421).

When the job processing is not completed, the task control unit 201 repeats waiting processing for a certain time (S422). Subsequently, when the job is completed, the task control unit 201 immediately performs the activation processing of the second task and the activation completion waiting (S431, S432). When the waiting processing is instructed, the CPU 121 puts the task control unit 201 into an idle state for a certain time. That is, while the job is processed, CPU resource can be allocated to the processing of the job. That is, a conflict between the data prefetching processing executed by the task control unit 201 and the PDL processing by the PDL control unit 250 can be avoided.

In addition, according to the present exemplary embodiment, since the files (data) are simply prefetched at small time intervals in the certain time to be developed into the disc cache, the development can be promptly stopped in a case where the particular job that can be processed by the first task initialization processing is accepted.

It is presumed that the second task initialization processing is interrupted to process the particular job without the CPU conflict with the second task initialization processing in a situation where the second task initialization processing is executed. However, since the work memory area of the RAM 123 is consumed by the second task initialization processing, the particular job is to be processed by the limited work memory area, which may lead to a decrease in a processing speed. In contrast to this, according to the present exemplary embodiment, since the file prefetching is performed instead of the second task initialization processing, a memory consumption of the RAM 123 can be suppressed as compared with the second task initialization processing, and it is possible to avoid the decrease in the processing speed of the accepted particular job.

The second task initialization processing is performed by using the files or part of the files developed into the disc cache by the prefetching processing performed until the job is accepted after the first task initialization processing. It should be noted that the files read out from the ROM 122 or the built-in storage unit 130 are used as the files or part of the files that are used in the second task initialization processing but are not developed into the disc cache.

FIG. 5 illustrates an example of the prefetching file list according to the present exemplary embodiment.

The prefetching file list is a list of the files set as targets of the prefetching processing. The prefetching file list can be previously possessed in the ROM 122 as fixed information and also possessed in the built-in storage unit 130 as variable information. In addition, the prefetching file list can be configured to be dynamically generated for each activation.

Eight files are set as the targets in the example of FIG. 5. Among those files, files Nos. 501 to 507 starting with "/var/rom" are read-only files stored in the ROM 122. The files Nos. 501 to 504 are files used for the extended function basic program 281 to operate.

For example, the file No. 501 is a program for providing a basic service. The file No. 502 is a program for communicating with the screen control unit 230. The file No. 503 is a program for obtaining various situation changes occurring in the image forming apparatus 102 and performing control. The file No. 504 is a program for controlling user authentication in the image forming apparatus 102.

The files Nos. 505 to 507 are files used for the second PDL module 252 to operate. For example, the file No. 505 is data of basic European fonts. The file No. 506 is data of Japanese fonts. The file No. 507 is data of CMYK profiles.

A file No. 508 starting with "/var/storage" is a readable/writable file stored in the built-in storage unit 130. This file is a file used for the IC card authentication program 221 to operate.

It should be noted that this file is described as a file having an extension "app" herein. This file may be an execution file in some cases, but furthermore, an archive file obtained by putting an execution file and a data file in an archive may be listed on the prefetching file list. According to the present exemplary embodiment, the above-described eight files are the target files of the prefetching processing to be developed into the disc cache of the RAM 123 from the ROM 122 or the built-in storage unit 130.

Figure 6:
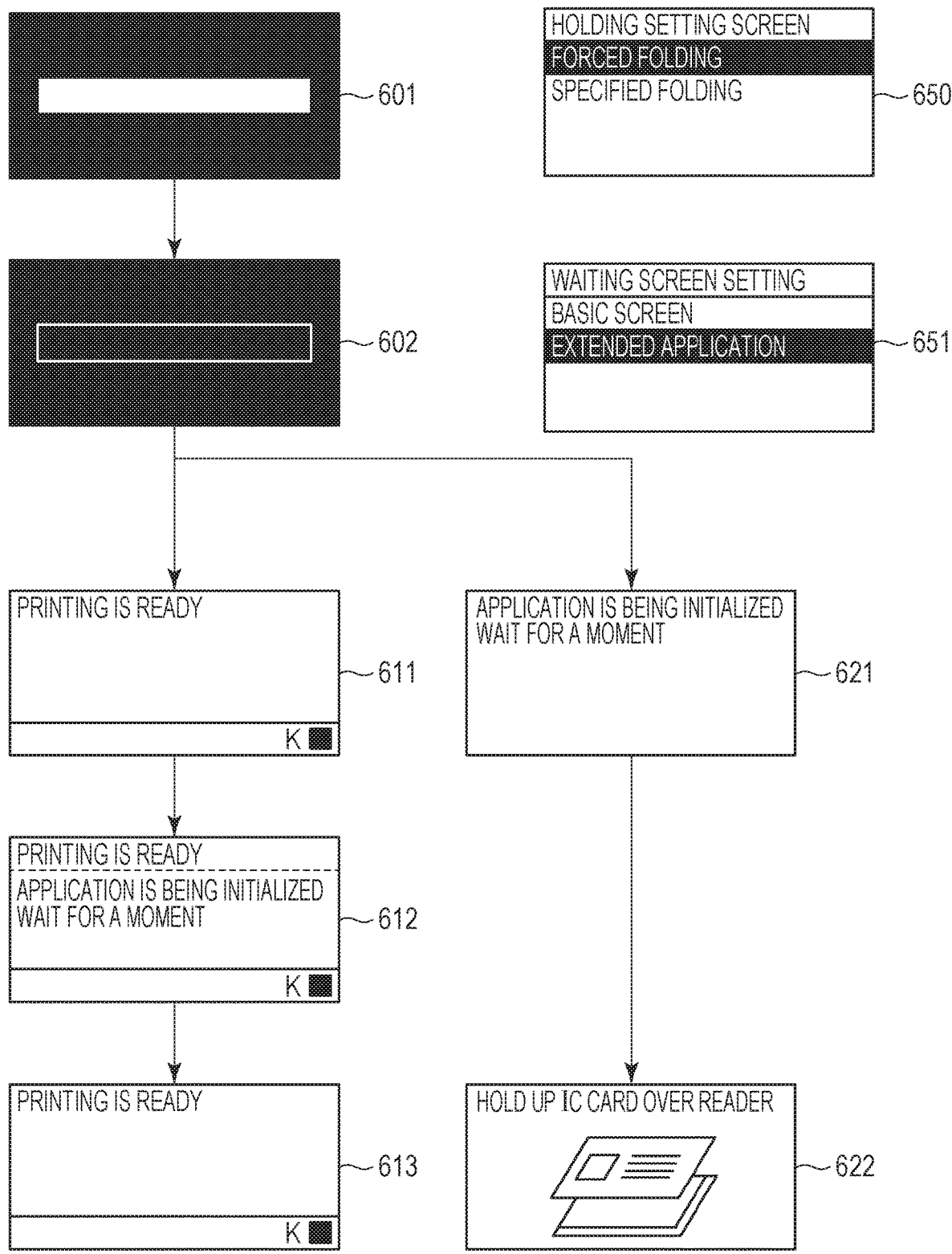
FIG. 6 illustrates a screen example according to the first exemplary embodiment.

FIG. 6 illustrates a screen example according to the present exemplary embodiment.

The screen control unit 230 includes a screen for performing activation progress display, a setting change menu function, and the like. Herein, the screen for performing the activation progress display, a holding setting screen 650, and a waiting screen setting screen 651 are extracted and described.

When the power source of the image forming apparatus 102 is turned on, the screen control unit 230 notifies the user of the progress of the first task initialization processing. For example, in a stage where the hardware resource control unit initialization is started and the initialization of the UI panel 111 is ended, the panel control module 212 displays a screen 601 on the UI panel 111. The task control unit 201 issues a screen update request to the screen control unit 230 at the end of the initialization of the respective control units. The screen control unit 230 updates the progress of a progressive bar on the screen in accordance with this progress. A screen 602 is displayed at the time when the job control unit initialization is ended, that is, in a stage where the initialization of the control unit related to the first task initialization processing is ended.

When the first task initialization processing is completed (that is, within the period from S403 up to S431), the screen control unit 230 notifies the user that printing can be performed by displaying a basic waiting screen 611. During the activation processing of the second task (from S431 to S432), the screen control unit 230 displays a second task activation screen 612. Subsequently, the screen control unit 230 displays a basic waiting screen 613 after the completion of the activation of the second task (in S432 and subsequent steps). With these configurations, the screen control unit 230 can notify the user of the activation processing progress by displaying the information on the LCD on the UI panel 111.

The holding setting screen 650 is a setting screen on whether or not a forced holding function to which the job control unit 270 refers is enabled. In a case where forced holding is selected, the job control unit 270 deals with all the PDL jobs transmitted to the image forming apparatus 102 as the holding jobs. In a case where specified holding is selected, the job control unit 270 deals with the PDL jobs as the holding jobs only in a case where the PDL jobs transmitted to the image forming apparatus 102 are specified as the holding jobs. The PDL jobs to be dealt with as the holding jobs are processed by the PDL holding module 271. The PDL jobs that are not the holding jobs are processed by the PDL printing module 272 as the printing targets. When the above-described setting is used, the printing processing can be only performed via the IC card authentication program 221.

The waiting screen setting screen 651 is a setting screen for selecting a screen for selecting a screen to be displayed when the screen control unit 230 is in a standby state. In a case where the basis screen is selected, the basic waiting screen 611 or the basic waiting screen 613 is displayed as described above. In a case where an extended application is selected, a screen provided from the extended function application via the extended function control unit 280 is displayed as the waiting screen.

For example, according to the first exemplary embodiment, the IC card authentication program 221 operates. In this case, the screen control unit 230 displays an extended function activation screen 621 instead of the display of the basis screen 611 after the screen 602. Subsequently, an extended function screen 622 is provided from the extended function application side, and the screen control unit 230 displays the extended function screen 622.

According to the present exemplary embodiment, it is possible to perform the prefetching of at least part of data used for the second task initialization processing while the screen control unit 230 displays the basic waiting screen 611. As a result, it is possible to shorten the time until the basic waiting screen 613 or the extended function screen 622 is displayed on the screen.

Figure 7:
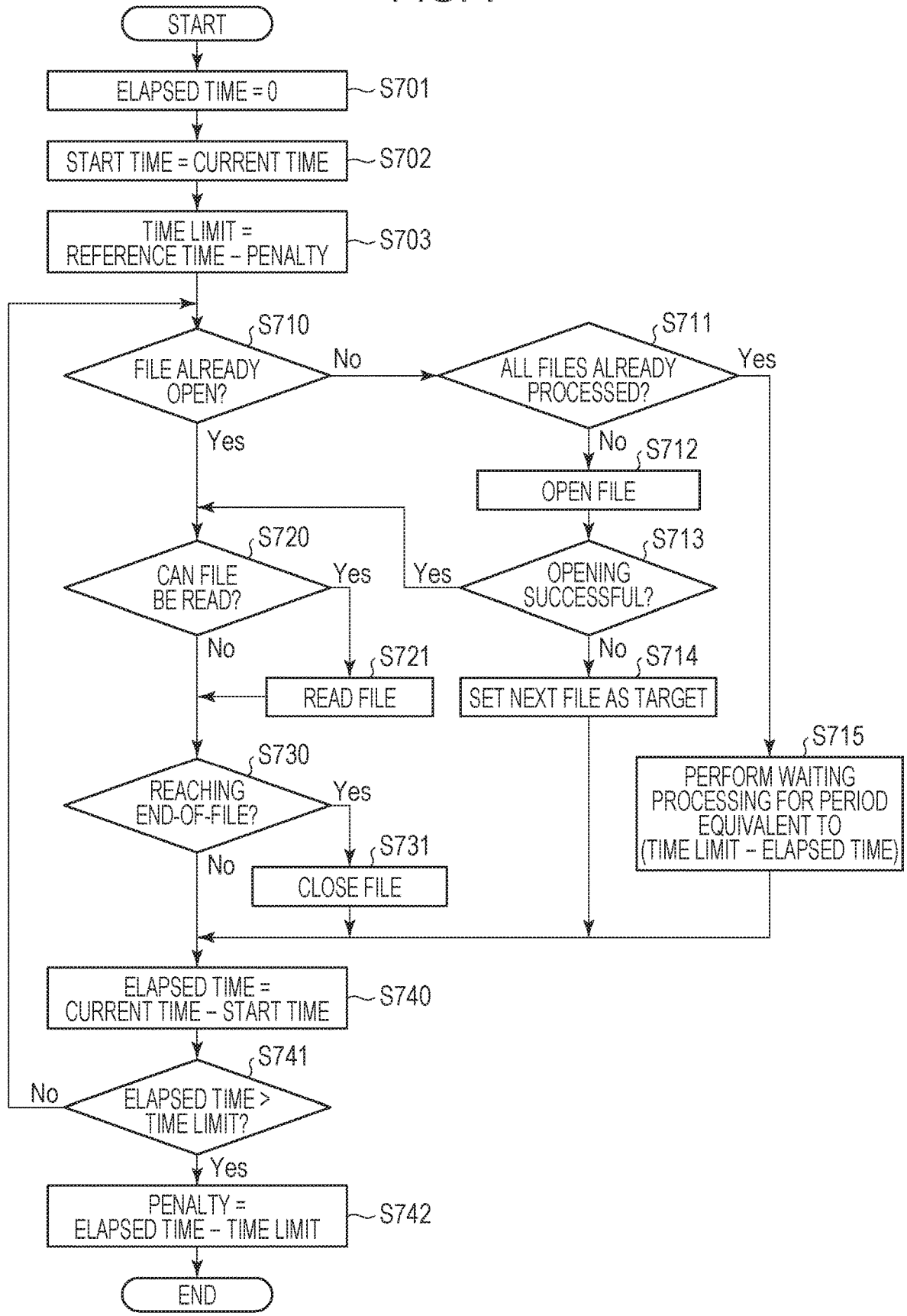
FIG. 7 is a flow chart illustrating a procedure of job acceptance/data prefetching parallel processing according to the first exemplary embodiment.

FIG. 7 is a flow chart illustrating a procedure of the job acceptance/data prefetching parallel processing according to an aspect of the embodiments.

This processing is the processing executed in S413 on FIG. 4. Specifically, the task control unit 201 develops the contents of the files described on the prefetching file list which will be described below into the disc cache on the RAM 123 via the file system control unit 220 in accordance with a time limit. According to the present exemplary embodiment, a time of a reference for determining the time limit (reference time) is set as 200 milliseconds, and a time (time limit) for performing the prefetching processing in S413 is determined on the basis of 200 milliseconds.

It should be noted that, as a method of accessing a file via the file system control unit 220, a unit by the intermediary of a file pointer corresponding to a pointer to an area including information such as access position of the file at this moment is generally used is generally used. According to the present exemplary embodiment, a prefetching file pointer configured to read out the contents of the files on the prefetching file list is defined. It should be noted that an initial state of the prefetching file pointer is a state in which the file is not yet opened.

The task control unit 201 initializes the elapsed time to 0 (S701).

The task control unit 201 obtains the current time via the RTC control module 217 and set this time as the start time (S702). The task control unit 201 sets a time obtained by subtracting a penalty time (hereinafter which will be simply referred to as penalty) determined by the prefetching processing in this flow which is executed in the previous time from the reference time (according to the present exemplary embodiment, 200 milliseconds) as the time limit of the prefetching processing in this flow which is executed this time (S703). This penalty is a time (overtime) for which the prefetching processing is performed beyond the set time limit when this flow is executed in the previous time. This penalty is obtained in S742 which will be described below when this flow is executed in the previous time. This penalty is a correction value for setting an average time of the processing time for each time to become approximately the reference time. In a case where the overtime of the processing in the previous time beyond the time limit is 40 milliseconds, the penalty is set as 40 milliseconds. The time limit in the processing in this time is set as 160 milliseconds obtained by subtracting the penalty from the reference time 200 milliseconds.

The task control unit 201 verifies whether or not the file is already opened by checking the prefetching file pointer and branches the processing in accordance with the result (S710).

When the file is already opened (S710: Yes), the processing proceeds to S720. When the file is not yet opened (S710: No), the task control unit 201 verifies whether or not all the files are already processed and branches the processing in accordance with the result (S711).

When an unprocessed file exists on the prefetching file list (S711: No), the task control unit 201 opens this file (S712). Subsequently, the task control unit 201 verifies whether or not the opening of this file is successful and branches the processing in accordance with the result (S713).

In a case where the file opening is successful (S713: Yes), the task control unit 201 verifies whether or not the file can be read by the prefetching file pointer and branches the processing in accordance with the result (S720).

When the file is not to be read (S720: No), the processing proceeds to S730. When the file can be read (S720: Yes), the task control unit 201 reads the contents of the prefetching file via the file system control unit 220 to be developed into the disc cache on the RAM 123 (S721). The reading and the development of the contents of the file at this time are performed for a predetermined data size (for example, 4 KB).

The task control unit 201 verifies whether or not the prefetching file pointer reaches end-of-file and branches the processing in accordance with the result (S730). When the prefetching file pointer does not reach end-of-file (S730: No), the processing proceeds to S740. In a case where the prefetching file pointer reaches end-of-file (S730: Yes), the task control unit 201 closes the prefetching file (S731).

In a case where the file opening is failed (S713: No), the task control unit 201 sets the next file on the prefetching file list as the target (S714).

When all the files on the prefetching file list are already processed (S711: Yes), the waiting processing is performed for only a difference between the time limit and the elapsed time (S715).

The task control unit 201 updates the elapsed time from the difference between the current time and the start time (S740). The task control unit 201 verifies whether or not the elapsed time passes the set time limit in S703 and branches the processing in accordance with the result (S741). In a case where the elapsed time does not pass the time limit (S741: No), the processing returns to S710, and in a case where the elapsed time passes the time limit (S741: Yes), the processing proceeds to S742.

The task control unit 201 stores the difference between the elapsed time and the time limit as the penalty to which the reference is to be made when the processing is performed next time (S742).

When the above-described processings are performed, while the task control unit 201 accepts the job related to the first task, the task control unit 201 develops the contents of the files on the prefetching file list into the disc cache on the RAM 123. As a result, with regard to the second task initialization processing performed in S431 and S432, the file contents can be read out from the disc cache of the RAM 123 having a high access speed instead of reading out from the ROM 122 or the built-in storage unit 130 having a low access speed.

With the above-described configurations, the following advantages are attained. (1) The time since the power source is turned on until it becomes possible to use the function related to the first task (for example, printing of the PDL data of the first type) can be set immediately after S402 to use the function. (2) The first print out time (FPOT) performance of (1) can be set at the comparable level to a case where the execution is performed when the CPU that has completed the activation of all the functions is in an idle state while the conflicting operations are avoided by performing the waiting processing in S422. (3) The time until it becomes possible to use the function related to the second task (for example, printing of the PDL data of the second type) can be suppressed at the comparable level to a case where the job acceptance/data prefetching parallel processing is not performed by performing the file prefetching in S413.

Second Exemplary Embodiment

According to the first exemplary embodiment, the case has been described where the time from the completion of the first task initialization processing after the power source is turned on until the start of the second task initialization processing is set as the first threshold time.

According to the second exemplary embodiment, a case will be described where the time for performing the job acceptance/data prefetching parallel processing is maximized, for example.

Figure 8:
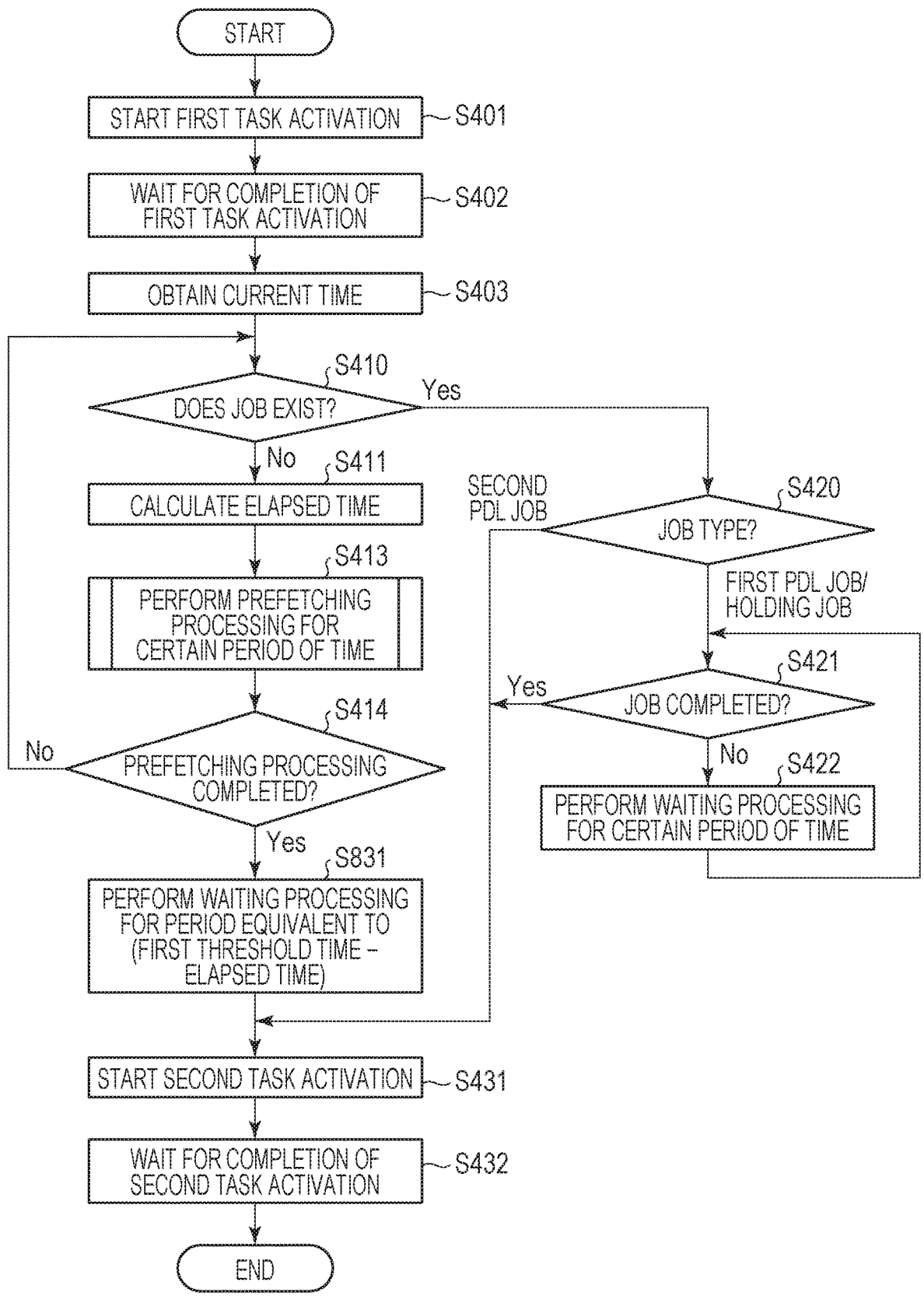
FIG. 8 is a flow chart illustrating the procedure of the task activation control according to a second exemplary embodiment.

FIG. 8 is a flow chart illustrating a procedure of the task activation control according to the present exemplary embodiment.

FIG. 8 and FIG. 4 are different from each other in two aspects. The first difference resides in that the processing in S412 according to the first exemplary embodiment does not exists. The second difference resides in that the task control unit 201 performs the waiting processing only for the difference between the first threshold time and the elapsed time (S831) in a case where the prefetching is completed before the elapse of the first threshold time by determining whether or not the prefetching is completed in S414.

According to the first exemplary embodiment, the data prefetching processing is performed as much as possible within the first threshold time. For this reason, the completion of the prefetching processing is not guaranteed with respect to all the files described on the prefetching file list.

According to the second exemplary embodiment, the prefetching processing is performed to be completed with respect to all the files described on the prefetching file list as long as the job is not accepted. Subsequently, even in a case where the prefetching processing is completed before the elapse of the first threshold time, the start of the second task initialization processing is waited so that the first PDL job or the holding job may be processed only in the first threshold time (while avoiding the conflict with the second task initialization processing).

An advantage of the second exemplary embodiment as compared with the first exemplary embodiment resides in that the job accepting time related to the first task can be lengthened without delaying the activation completion time of the second task.

Other Exemplary Embodiments

According to the above-described exemplary embodiments, the caching (prefetching processing) of the data used in the second initialization as the processing related to the second initialization from the ROM to the RAM is performed. According to another exemplary embodiment, the second initialization may be started instead of this prefetching processing. In this case, the second initialization may be interrupted in accordance with the acceptance of the job that can be processed by the first initialization, and the second initialization may be resumed in accordance with the completion of the processing of the job.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-248233 filed Dec. 21, 2016, which is hereby incorporated by reference herein in its entirety.

What is claimed is:

1. An image forming apparatus comprising:
a first storage unit configured to store first data for activating a first module that interprets a first type of PDL data and second data for activating a second module that interprets a second type of PDL data;
a second storage unit having a data reading speed higher than that of the first storage unit;
at least one processor configured to:
activate the first module by reading the first data from the first storage unit and placing the read first data in the second storage unit so that the image forming apparatus becomes able to process the first type of PDL data;
activate the second module by reading the second data from the first storage unit and placing the read second data in the second storage unit while the image forming apparatus is able to process the first type of PDL data;
receive the first type of PDL data; and
process the received first type of PDL data.

2. The apparatus according to claim 1, wherein the first storage unit is a hard disk drive, and the second storage unit is a random access memory.

3. An image forming apparatus comprising:
a first storage unit configured to store first data for activating a first module that interprets a first type of PDL data and second data for activating a second module that interprets a second type of PDL data;
a second storage unit having a data reading speed higher than that of the first storage unit;
at least one processor configured to:
activate the first module by reading the first data from the first storage unit and placing the read first data in the second storage unit so that the image forming apparatus becomes able to process the first type of PDL data;
read the second data from the first storage unit and place the read second data in the second storage unit while the image forming apparatus is able to process the first type of PDL data;
receive the first type of PDL data while the second data is being read from the first storage unit;
based on the reception of the first type of PDL data, stop the reading of the second data and process the received first type of PDL data; and
based on a completion of the processing of the received first type of PDL data, restart the reading of the second data so that the second data is placed in the second storage unit.

4. The image forming apparatus according to claim 3, wherein the first storage unit is a hard disk drive, and the second storage unit is a random access memory.

5. A control method for controlling an image forming apparatus that includes a first storage unit configured to store first data for activating a first module that interprets a first type of PDL data and second data for activating a second module that interprets a second type of PDL data and further includes a second storage unit having a data reading speed higher than that of the first storage unit,
the control method comprising:
activating the first module by reading the first data from the first storage unit and placing the read first data in the second storage unit so that the image forming apparatus becomes able to process the first type of PDL data;
reading the second data from the first storage unit and placing the read second data in the second storage unit while the image forming apparatus is able to process the first type of PDL data;
receiving the first type of PDL data while the second data is being read from the first storage unit;
based on the reception of the first type of PDL data, stopping the reading of the second data and processing the received first type of PDL data; and
based on a completion of the processing of the received first type of PDL data, restarting the reading of the second data so that the second data is placed in the second storage unit.

6. The control method according to claim 5, wherein the first storage unit is a hard disk drive, and the second storage unit is a random access memory.

* * * * *